G. N. VAN SWERINGEN.
COMBINED RELEASE AND SUPPORT FOR BRAKE BEAMS.
APPLICATION FILED AUG. 11, 1921.
1,428,192.
Patented Sept. 5, 1922.
2 SHEETS—SHEET 2.
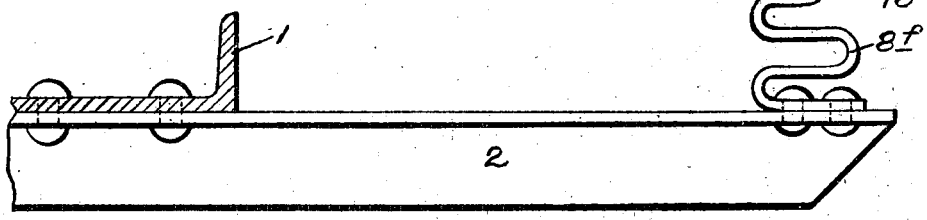
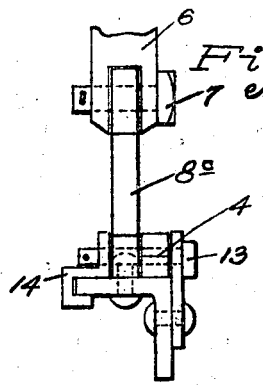
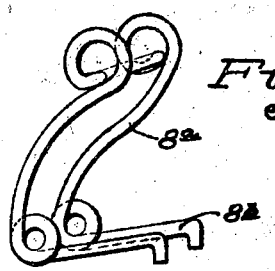
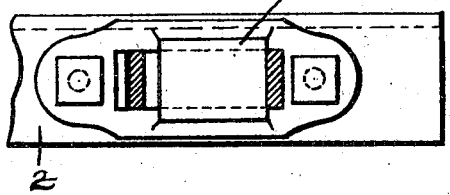
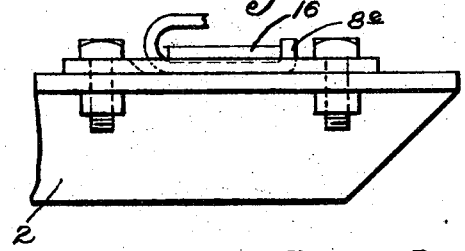
Inventor.
George N. Van Sweringen
By F. R. Cornwall Atty Patented Sept. 5, 1922.

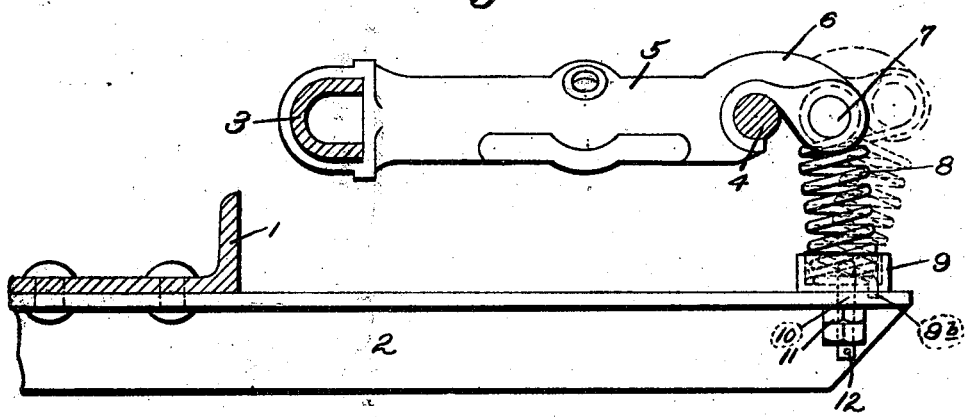
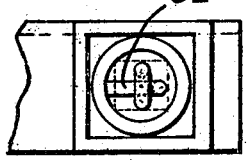
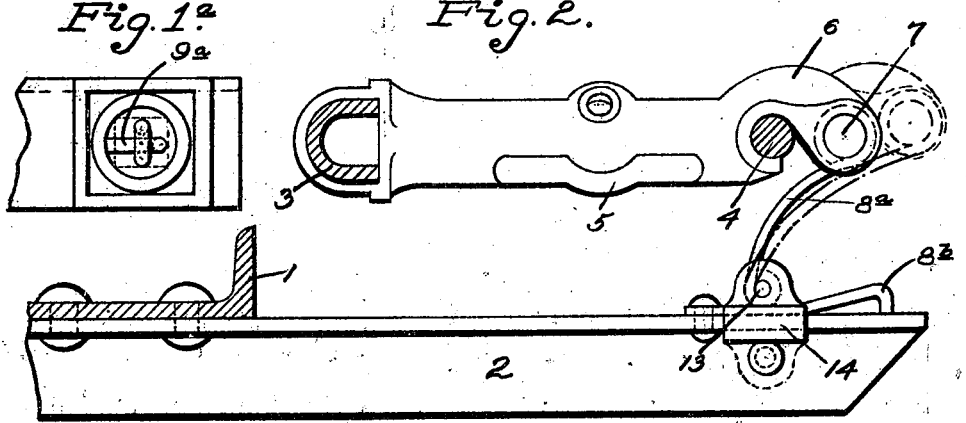
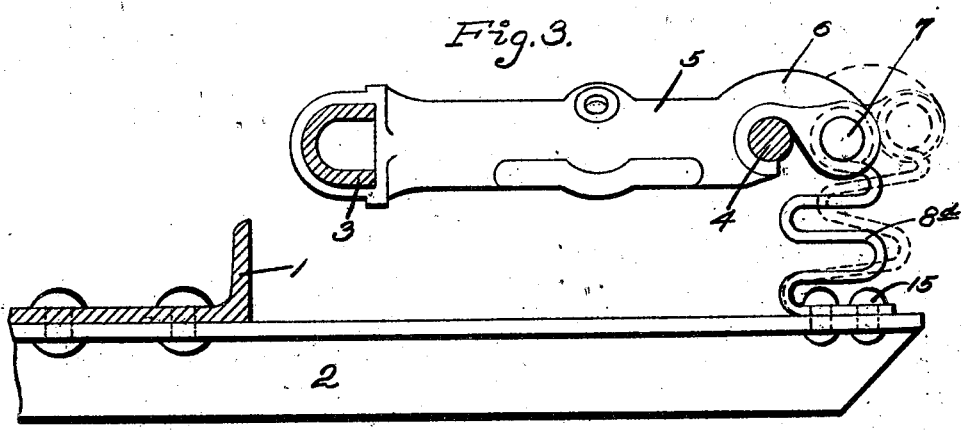

1,428,192

UNITED STATES PATENT OFFICE.

GEORGE N. VAN SWERINGEN, OF CHICAGO, ILLINOIS, ASSIGNOR TO CHICAGO RAILWAY EQUIPMENT COMPANY, OF CHICAGO, ILLINOIS, A CORPORATION OF ILLINOIS.

COMBINED RELEASE AND SUPPORT FOR BRAKE BEAMS.

Application filed August 11, 1921. Serial No. 491,533.

*To all whom it may concern:*

Be it known that I, GEORGE N. VAN SWERINGEN, a citizen of the United States, residing at the city of Chicago, county of Cook and State of Illinois, have invented a certain new and useful Improvement in combined Releases and Supports for Brake Beams, of which the following is a full, clear, and exact description, such as will enable others skilled in the art to which it appertains to make and use the same, reference being had to the accompanying drawings forming part of this application, in which,—

Figure 1 is a side elevational view of a combined release and support for brake beams made according to my present invention.

Figure 1ª is a plan view of the anchoring means for the lower end of the spring shown in Figure 1.

Figure 2 is a side elevational view of a modified form.

Figure 3 is a similar view of another modified form.

Figure 4 is a similar view showing my invention as applied to a fourth point support.

Figures 5 and 6 are detail views of the different forms of release springs.

Figures 7 and 8 are top plan and side elevational views, respectively, of detachable means for anchoring the release spring to the safety bar.

This invention relates to a new and useful improvement in combined release and support for brake beams, the object being to utilize the dual functions of a yielding member, such as a spring, which will be placed under compression to yieldingly support the beam in its released position, and under tension, to assist in retracting the beam to its released position after the brakes have been applied.

I am aware that it is old to provide a separate means for independently performing the above described functions. In Williams Patent No. 1,255,967, dated February 12, 1918, there is shown a retraction spring operating in front of the brake beam, the beam being guided in its brake applying movement by other and independent means, such as an inclined track. In the Williams Patent No. 1,278,540, dated September 10, 1918, there is shown a locking element which will yieldingly support the beam and cause its inner end to be elevated in the brake applying movement, but in this form of support there is no retractive or releasing energy directed against the beam.

In the Williams Patent No. 1,369,866, dated March 1, 1921, there is shown a yielding support for the beam, but there are no means for releasing; and in the Williams Patent No. 1,369,867, dated March, 1921, there is shown a yielding support for the beam loosely mounted on an inclined track, and in one form of this invention, this mount is provided with an extension which may serve as a release spring; but for all practical purposes, the yielding supporting and releasing members might be separate and distinct because their actions are entirely independent of each other and not interdependent, as in the case of my present invention.

In the drawings, 1 indicates the spring plank of a car truck, here shown as a channel, to which is secured a brake beam support in the form of a flanged rigid safety bar member 2.

In the application of my invention to third point supports, shown in Figures 1, 2 and 3, 3 indicates the compression member, 4 the tension member and 5 the strut or brake lever post having a nose 6 for receiving a bolt or rivet 7. This bolt or rivet serves as a means of attachment of the upper end of a spring 8, shown in Figure 1, as a coiled spring having an eye which receives the rivet 7. The lower end of this coiled spring is seated in a spring seat 9 and is provided with a cross bar 9ª whose end 9ᵇ is bent to pass through registering openings in the bottom of the spring seat and flange of the safety bar member. The bolt 10 having a hook on its inner end engaging the cross bar 9ª tends to hold the spring 8 and the spring seat 9 in position on the member 2, there being nuts 11 on bolt 10 for clamping the parts together. A cotter pin 12 may be employed under the jam nut to prevent the nuts working loose. The bent end 9ᵇ of the spring prevents the spring seat 9 from rotating on the safety bar member 2.

When the parts are in the full line position shown in Figure 1, the weight of the brake beam, or, at least, the inner end thereof is supported by the coiled spring 8, which is under compression and thus constitutes a yielding support for the brake beam in its released position. However, when the brakes are applied and the beam moves rightwardly and slightly upwardly, such brake application movement will place the spring 8 under tension, as indicated by dotted lines in Figure 1, and at the same time place said spring under a torsional or twisting strain so that when the brakes are released, spring 8 in seeking to re-establish molecular equilibrium which has been disturbed, will exert pressure on the beam tending to release the brakes and retract the beam to its normally released position.

In Figure 2, I have shown a form of bent torsional spring $8^a$ (see also Figure 6) which is pivotally connected to the rivet 7 at one end and to a rivet 13 mounted in the bracket 14 secured to the safety member 2, the legs of spring $8^b$ resting on the upper surface of the member 2. When the brakes are applied in this form of my invention, the parts assume the position shown in dotted lines and the energy thus stored up in the spring will be exerted to release the brakes and hold the beam in its retracted position. In Figure 5, I have shown a single leaf torsional spring $8^c$ which operates substantially the same as spring $8^a$.

In Figure 3, I have shown a refolded spring $8^d$ whose lower end is anchored to the horizontal flange of the safety bar member 2 by means of rivets 15. If desired, this lower end may be detachably anchored to the safety bar member by means of a bracket 16, shown in Figures 7 and 8, in which event the end of the spring may be bent up, as at $8^e$, to engage the edge of the bridge or cross member of the bracket.

In Figure 4, I have shown a fourth point support in which a clip 17 is secured to the tension member 4 and the upper end of the refolded spring $8^f$ shown in this form may be secured to the clip by means of a bolt or rivet 18, or the upper end of the spring may be formed with an eye to engage a bolt or rivet arranged at right angles to rivet 18.

What I claim is:

1. A combined support and release for brake beams consisting of a single elastic member.

2. A combined support and release for brake beams consisting of a single member capable of being compressed and expanded.

3. A combined support and release for brake beams possessing properties of compressibility and expansibility and having anchorage means at each end.

4. The combination of a brake beam, a safety bar member, and a combined support and release connected to said parts.

5. The combination of a brake beam, a safety bar member, and a combined support and release connecting said parts and capable of being compressed and distended.

6. The combination of a brake beam, a rigid safety bar member, and a combined supporting and releasing spring detachably connected to both of said parts.

7. The combination with a brake beam and a rigid safety member of a combined supporting and release spring, co-operating with said beam and safety member.

In testimony whereof I hereunto affix my signature this 5th day of August, 1921.

G. N. VAN SWERINGEN.